(12) United States Patent
Einola et al.

(10) Patent No.: US 6,771,964 B1
(45) Date of Patent: Aug. 3, 2004

(54) HANDOVER BETWEEN WIRELESS TELECOMMUNICATION NETWORKS/SYSTEMS

(75) Inventors: Heikki Einola, Espoo (FI); Lauri Lahtinen, Espoo (FI); Bo Axerud, Helsinki (FI); Kati Vainola, Hikiä (FI); Susanna Kallio, Espoo (FI)

(73) Assignee: Nokia Networks, Nokia Group (FI)

( * ) Notice: Subject to any disclaimer, the term of this patent is extended or adjusted under 35 U.S.C. 154(b) by 0 days.

(21) Appl. No.: 09/406,209

(22) Filed: Sep. 24, 1999

(51) Int. Cl.[7] .................................................. H04O 7/20
(52) U.S. Cl. ...................... 455/437; 455/436; 370/331
(58) Field of Search ................................ 455/437, 436, 455/438, 439; 370/331, 435.1, 435.2, 435.3

(56) References Cited

U.S. PATENT DOCUMENTS

| | | | |
|---|---|---|---|
| 5,878,036 A | 3/1999 | Spartz et al. | 370/335 |
| 5,878,349 A | 3/1999 | Dufour et al. | |
| 5,884,175 A | 3/1999 | Schiefer et al. | 455/436 |
| 5,907,808 A | 5/1999 | Vaara et al. | 455/441 |
| 5,914,937 A | 6/1999 | Arnold | 370/231 |
| 5,920,410 A | 7/1999 | Smith et al. | 359/119 |
| 5,930,712 A | 7/1999 | Byrne et al. | |
| 5,940,753 A | 8/1999 | Mallinckrodt | |
| 6,134,443 A * | 10/2000 | Spann et al. | 455/450 |
| 6,167,279 A * | 12/2000 | Chang et al. | 455/462 |
| 6,385,451 B1 * | 5/2002 | Kalliokulju et al. | 455/437 |

FOREIGN PATENT DOCUMENTS

GB     2 322 051 A     8/1998

OTHER PUBLICATIONS

C. Bettstetter, et al GSM Phase 2+General Packet Radio Service GPRS: Architecture, Protocols, and Air Interface, http://www.comsoc.org/livepubs/surveys/public/3q99issue/bettstetter.html, pp. 1–15, printed Nov. 21, 2002.

"The Challenges of Seamless Handover in Future Mobile Multimedia Networks" in IEEE Personal Communication, Apr. 1999, ps. 32–37.

* cited by examiner

*Primary Examiner*—Vivian Chin
*Assistant Examiner*—Lewis G. West
(74) *Attorney, Agent, or Firm*—Cohen, Pontani, Lieberman & Pavane

(57) ABSTRACT

A method and a wireless telecommunication system of performing network-assisted handover of calls between a serving network and another wireless network that employs communication protocols different from those of the serving network. A message is sent from a mobile station of a user to the serving wireless network, which includes an indication that the mobile station is capable of communicating with the neighboring wireless network. Information relating to the communication characteristics of the neighboring wireless network is also sent from the serving wireless network to the mobile station. Using the information relating to the communication characteristics of the neighboring wireless network, the mobile station receives radio signals from the neighboring wireless network. The quality of the radio signals between the mobile station and the neighboring wireless network is measured. The serving wireless network sends a message to the neighboring wireless network to request a handover of the communication transaction when the quality of the radio signals between the neighboring wireless network and the mobile station meets a predetermined minimum threshold. Then a handover of the communication transaction from the serving wireless network to the neighboring wireless network is executed after the neighboring wireless network has established a communication channel for the mobile station pursuant to the handover request.

15 Claims, 3 Drawing Sheets

HANDOVER BETWEEN WIRELESS TELECOMMUNICATION NETWORKS/SYSTEMS

BACKGROUND OF THE INVENTION

1. Field of the Invention

The present invention is related to digital wireless telecommunications and, in particular, to a method and apparatus for processing the handover of voice and data calls between networks configured to different telecommunications standards.

2. Description of the Related Art

One of the most widely-used digital wireless telecommunications standard is the Global System for Mobile communications (GSM) standard, developed by the European Telecommunications Standards Institute, which utilizes time division multiple access (TDMA) techniques. The GSM standard is incorporated herein by reference. A GSM-compliant wireless communication system includes a radio access network, known as a base station subsystem (BSS), comprising a plurality of base transceiver stations (BTSs) for transmitting and receiving radio frequency (RF) signals from a subscriber's mobile station (MS) (e.g., a cellular phone, a pager, a portable computer, etc.), and at least one base station controller (BSC) for managing radio resource and routing signals to and from the BTSs. Each BTS is constructed to transmit and receive signals from within a predetermined geographic region called a cell. In accordance with the GSM standard, the system further includes a fixed or core network having a circuit switched (or voice switching) portion for processing voice calls and a packet switched (or data switching) portion for supporting bursty, high speed data transfers such as, for example, e-mail messages and web browsing. The circuit switched portion includes a mobile-services switching center (MSC) that switches or connects telephone calls between the radio-access network (i.e., the BSS) through a BSC, and a subscriber's public switched telephone network (PSTN) or a public land mobile network (PLMN). The MSC is connected to a BSC through a standard interface known as the A-interface that requires signaling messages between the BSC and the MSC to be arranged in a particular order and format. The packet-switched portion, also known as General Packet Radio Service (GPRS), includes a Serving GPRS Support Node (SGSN), similar to the MSC of the voice-portion of the system, for serving and tracking the MS, and a Gateway GPRS Support Node (GGSN) for establishing connections between packet-switched networks and a mobile station. The SGSN may also contain subscriber data useful for establishing and handing over call connections. The core network also includes a home location register (HLR) for maintaining "permanent" subscriber data and a visitor location register (VLR) (and/or a SGSN) for "temporarily" maintaining subscriber data retrieved from the HLR and up-to-date information on the location of the mobile station.

A handover, as defined herein, is the process of automatically transferring a communication transaction (e.g., a call) in progress from one cell to another cell to avoid adverse effects of movements of a mobile station. A detailed description of the handover procedure(s) can be found in "The GSM System for Mobile Communications" by Michel Mouly and Marie-Bernadette Pautet, 1992 (ISBN: 2-9507190-0-7). The entire disclosure of this publication is incorporated herein by reference.

Thus, as an MS travels from cell to cell while conducting a telephone call, the BSC switches the MS from one BTS to another, based on signal measurement reports from the MS, by executing a handover procedure consistent with the GSM standard. As the MS travels further and further away from the original BTS, handover would occur between adjacent BSCs, and even between neighboring MSCs. In a similar fashion, as an MS maintains a packet-switched portion while traveling from one cell to another, the handover would occur between adjacent SGSNs. Thus, voice and data calls can be established and maintained, so long as the MS travels within an area serviced by the GSM network.

Problems occur, however, when a subscriber desires to switch between a GSM network and another wireless network such as, for example, a network configured to the Universal Mobile Telephone Service (UMTS) standard, which employs recently developed wide-band code division multiple access (W-CDMA) techniques for paired spectrum bands and TD-CDMA for unpaired bands. The UMTS standard is incorporated herein by reference. A UMTS compliant system typically comprises a core network (CN) and a UMTS Radio Access Network (URAN) that includes a ground-based portion. The ground-based portion of the radio access network (RAN) is often referred to as the UMTS Terrestrial Radio Access Network (UTRAN) and comprises a radio network controller (RNC) and a base station (BS), having similar functionality as the BSC and the BTS of a GSM network respectively. New radio interfaces have been specified for communication between different UMTS subsystems such as, for example, the Iu interface between UTRAN and CN, which are different from those interfaces used by GSM devices.

Heretofore, handover of a call has been based only on uplink and downlink radio transmission quality (e.g., data bit error rate) between the mobile station and neighboring cells of the serving network or a neighboring network to avoid dropping the call. However, current systems do not provide efficient support for initiating a handover in a situation where a subscriber desires to use another network based not only on radio transmission quality but also on performance parameters such as, for example, data transmission rate, and/or subscription services available to the user.

Accordingly, there is a need for handling the handover of calls between different communication networks based on, for example, subscriber preferences when the MS is capable of and permitted to utilize the different networks.

SUMMARY OF THE INVENTION

An object of the present invention is to initiate handover of a communication transaction between different mobile telecommunication networks based on user and/or network specified parameters.

An advantage of the invention is that the radio access network (e.g. BSS or UTRAN) is provided with additional guidance or requirements from a user and/or the user's service provider of a handover of a communication transaction from a serving wireless network to a neighboring wireless network, when the mobile station is in a region covered by the different networks. As defined herein, the neighboring wireless network may cover a region adjacent to, overlapping with, or within that covered by the serving network.

According to one aspect of the invention, the core network such as, for example, the MSC, the SGSN, and/or an integrated MSC/SGSN having functions of both the MSC and SGSN is provided with information relating to the capabilities of an MS to operate within a multitude of networks, the connection properties required or desired by the MS, and subscription services available to the user of the MS. This information is transmitted to a controller of the radio access network such as, for example, a base station controller of a GSM network or a radio network controller of a UMTS network so as to further assist the controller in determining whether a call (voice or data) may be handed over to another network. The controller may also utilize the information to determine whether the MS may initiate a call within a particular network.

According to another aspect of the invention, a multi-mode mobile station capable of communicating with different wireless networks sends a signaling message to a core network node (e.g. an MSC, SGSN or MSC/SGSN) indicating its capability to operate in various network environments. The signaling message is preferably a binary number having at least two logical values for indicating whether the mobile station can support radio access to another network such as, for example, a UMTS network. The binary number may be incorporated in an information element compliant with the GSM standard such as the GSM Mobile Station CLASSMARK 3 information element. The core network node also retrieves and/or analyzes information relating to, for example: (a) quality of service ("QoS") (e.g. voice quality) requested by the mobile station during setup, (b) network congestion, (c) location of the mobile station, etc. MSC (or SGSN) then sends to the controller of the radio access network a signaling message (e.g. a recommendation or command) incorporating the above information so as to assist the controller of the radio access network portion in determining whether to initiate a handover to another network. The controller of the radio access network may also utilize information relating to network congestion and location of the mobile station to determine whether a handover is to be executed.

In one embodiment, a message is sent from a mobile station to the serving wireless network, which includes an indication that the mobile station is capable of communicating with the neighboring wireless network. The message may also include the requisite connection properties, and/or parameters indicating the permission or preference of the user to utilize various networks. Information relating to the communication characteristics of the neighboring wireless network is sent from the serving wireless network to the mobile station. Using the information relating to the communication characteristics of the neighboring wireless network, the mobile station receives radio signals from the neighboring wireless network. The quality of the radio signals between the mobile station and the neighboring wireless network is measured. The serving wireless network sends a message to the neighboring wireless network to request a handover of the communication transaction, provided the quality of the radio signals between the neighboring wireless network and the mobile station meets one or more predetermined handover criteria or a predetermined minimum threshold. The predetermined handover criteria or threshold may be defined such that the to-be-established connection will be of a service quality specified by the user. A handover of the communication transaction from the serving wireless network to the neighboring wireless network is executed after the neighboring wireless network has established a communication channel for the mobile station pursuant to the handover request.

In another embodiment, execution of the handover is also based on previously stored subscription data relating to the preference or permission of the user to utilize the neighboring wireless network.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements in the several views.

DETAILED DESCRIPTION OF THE PRESENTLY PREFERRED EMBODIMENTS

Figure 1:
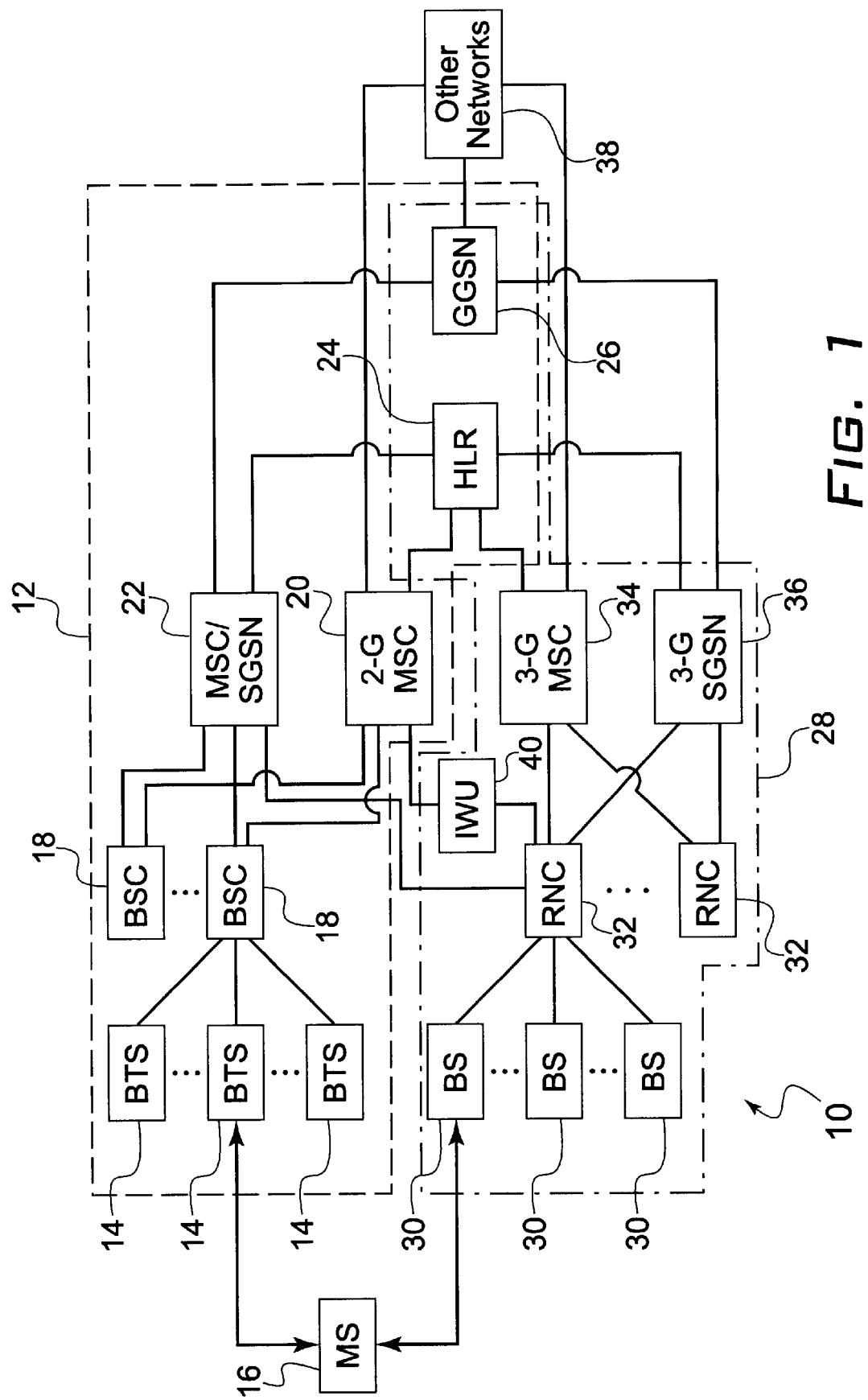
FIG. 1 diagrammatically illustrates a GSM network interfaced with a UMTS network.

FIG. 1 illustrates a wireless telecommunications system 10 constructed in accordance with a presently preferred embodiment of the present invention. The system 10 includes a GSM network 12 having a radio access network portion and a core network portion. The radio access network portion comprises a plurality of base transceiver stations (BTSs) 14 for transmitting and receiving voice and data calls from a mobile station (MS) 16, and a base station controller (BSC) 18. The BSC 18 manages radio resources by establishing, maintaining and releasing communication transactions between the MS 16 and the core network portion despite movements of the MS 16. Each BSC 18 is connected to a predetermined number of BTSs 14.

The GSM network 12 includes a core network portion (e.g., a land-based wireline portion) comprising a mobile switching center (MSC) 20 (e.g. a second-generation or 2-G MSC) for controlling voice calls between the wireless and wireline portions of the network. The core network portion may include another core network node such as a Serving GPRS Support Node (SGSN), or preferably, a MSC/SGSN 22, i.e. a core network node with SGSN and MSC capabilities, for supporting transfers of bursty high-speed data (e.g., text) and real-time data (e.g. voice) between the radio access network portion portion and the land-based (i.e., wireline) portion of the network 12. The MSC 20 is coupled to a VLR (not shown) that temporarily stores the location of the MS 16. The MSC 20, and SGSN or MSC/SGSN 22 are connected to a home location register (HLR) 24, which includes a database containing data specific to a subscriber, such as services available to the subscriber and location of the subscriber, i.e., address of the MSC/VLR. Each BSC 18 is connected to a core network node such as the MSC 20 through a conventional A-interface and the SGSN through a conventional $G_b$ interface. The SGSN or MSC/SGSN 22 is also connected to a Gateway GPRS Support Node (GGSN) 26 for accessing other packet networks.

FIG. 1 further illustrates a UMTS network 28 comprising a plurality of base stations 26 for receiving and transmitting calls to the MS 16. A predefined number of BSs 30 are connected to a radio network controller (RNC) 32 that interfaces with an MSC (e.g. a "third-generation or 3-G MSC") 34 through a conventional Iu interface (not shown). Similar to the MSC 20 of the GSM network 12, MSC 34 also accesses a HLR, which may be the same HLR (i.e. HLR 24) as that used by the GSM network, to retrieve subscriber-specific data. The RNC 32 is preferably connected to a SGSN (e.g. a third-generation or 3-G SGSN) 36 for high-speed data transfers, which is connected to packet networks 38 through a Gateway GPRS Support Node (GGSN). As shown, the GGSN of the UMTS network 28 may also be the same GGSN 26 used by the SGSN 22 of the GSM network 12.

An interworking unit (IWU) 40 couples the RNC 32 of UMTS network 28 to the second-generation MSC 20 of the GSM network 12. The IWU 40 interfaces with the MSC 22 through the A-interface and with the RNC 32 through the Iu interface. It is contemplated that the GSM network 12 may include a third-generation or 3-G MSC constructed to communicate with a BSC 18 using the A-interface and the RNC 32 using the Iu interface.

In accordance with the present invention, the system 10 is configured such that the MS 16 transmits to the core network portion information relating to its capability to communicate with various networks (e.g., GSM or UMTS) and/or the desired connection properties. Subscription data including the user's preference or permission to utilize the different networks, which is typically stored at the HLR 24, may be made readily accessible by or stored at a core network node such as, for example, a MSC, an SGSN or the like. Preferably, the core network node analyzes the aforementioned information and provides to the controller of the radio access network portion (e.g., BSC 18 or RNC 32) its recommendation or command for use by the controller 18, 32 as an additional input to its decision to execute a handover procedure.

Figure 2:
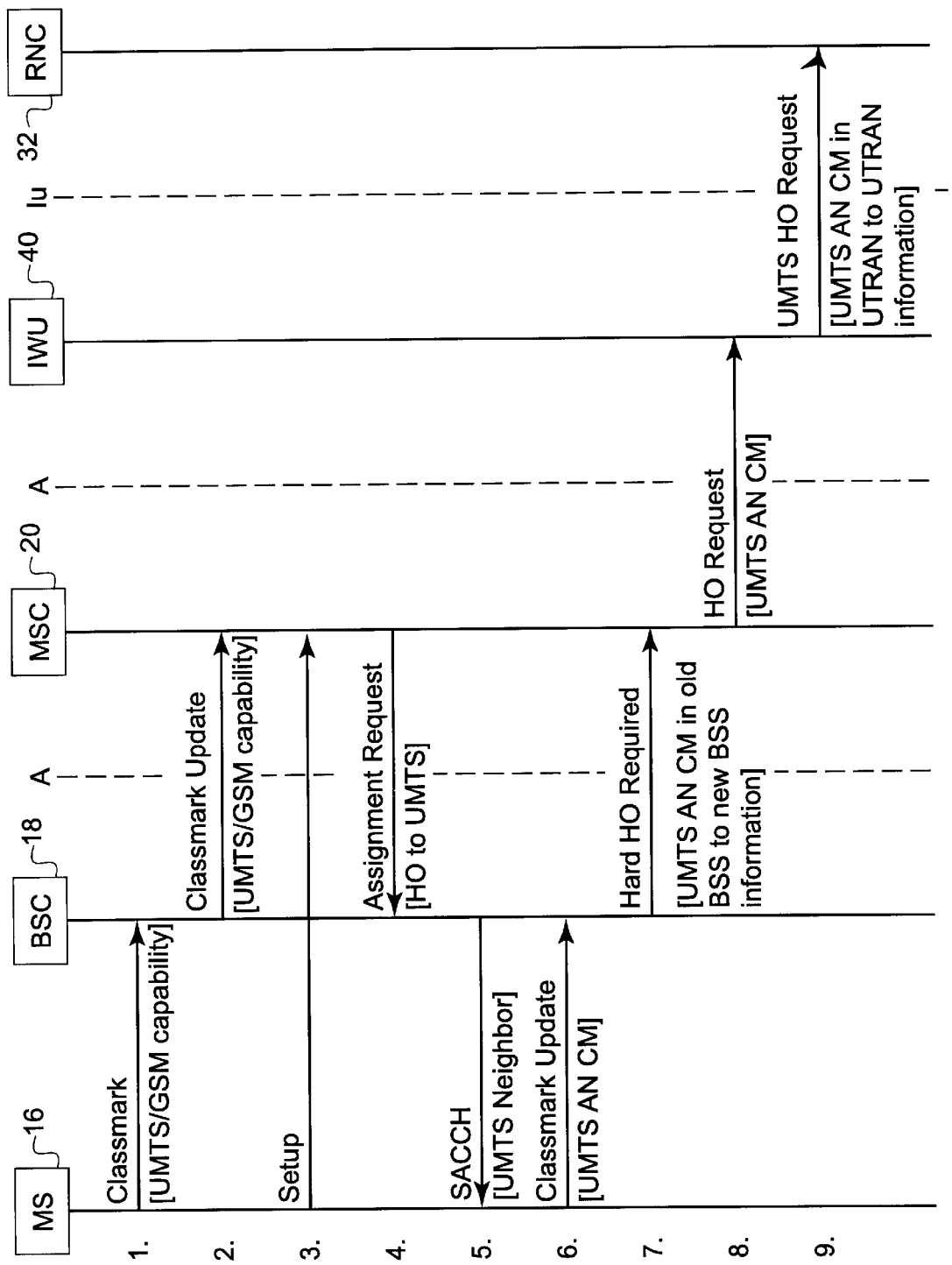
FIG. 2 is a signal flow diagram illustrating an embodiment of the present invention for handing over a voice call from a GSM network to a UMTS network.

FIG. 2 diagrammatically illustrates the signal flow of a handover of a communication transaction of a dual-mode MS 16 from the GSM network 12 to the UMTS network 28, in accordance with one embodiment of the invention. Preferably during location area or routing area update, the MSC 20 retrieves subscription data relating to the subscriber's preference or permission to use other networks from the HLR 24 and stores the data at a VLR coupled to the MSC. The general procedures of location area or routing area updates are well known in the art.

The MS 16 sends a GSM-formatted signaling message such as, for example, a CLASSMARK information element containing a new bit indicating its multi-network capability (e.g., dual GSM/UMTS capability) to the BSC 18 when the MS 16 is not in a dedicated mode such as, for example, during location area update or routing area update. The MS 16 also sends a SETUP message to the MSC 20 through BSC 18, which message contains the requisite information for establishing a communication transaction.

The CLASSMARK information element is preferably a CLASSMARK Type 3 (CM 3) information element. Alternatively, the new bit may be included in a signaling message such as, for example, ACTIVATE Packet Data Protocol (PDP) REQUEST or BEARER CAPABILITY information element. ACTIVATE PDP REQUEST is a request for a PDP context, which describes the characteristics of a communication session. Upon receipt, the BSC 18 sends the multi-network capability information to the MSC 20 via a signaling message (as defined in the GSM standard) such as, for example, CLASSMARK UPDATE to the MSC 20 via the A-interface. The CLASSMARK containing information about the multi-network capability of MS 16 can also be included in the CLASSMARK in the initial message (e.g., LU REQUEST, CM SERVICE REQUEST), which may be piggybacked to a COMPLETE LAYER 3 INFO message sent from BSC 18 to MSC 20. The MSC 20 may then send the BSC 18 a signaling message such as ASSIGNMENT REQUEST (to reserve a radio resource for MS 16) that includes a recommendation or a command indicating whether the connection may or may not be routed to another network such as UMTS network 28 based on the capability (e.g. hardware limitations) of the MS 16, the retrieved subscription data, connection properties, the location of the MS (e.g., a specified location area or cells), congestion (i.e., level of interference) in neighboring cells, etc. The recommendation or command may be in the form of a new Network Preference parameter piggybacked to or incorporated in an appropriate octet layer of the ASSIGNMENT REQUEST signaling message. The ASSIGNMENT REQUEST provides the BSC 18 various types of information including, for example, channel rate and type, permitted speech version indication, data rate and transparency indicator, etc., so that the BSC 18 may determine the radio resource(s) required for the connection.

The new Network Preference parameter may, for example, be a two-bit binary word coded so as to indicate the various subscriber preferences and permissible changes in network coverage such as: (a) GSM preferred, changes not allowed (i.e., the MS is only allowed to use the GSM network); (b) GSM preferred, changes allowed (i.e., the MS is allowed to use other networks (e.g. the UMTS network) but the GSM network is the preferred network); (c) UMTS preferred, changes not allowed (i.e., the MS is only allowed in the UMTS network); or (d) UMTS preferred, changes allowed (i.e., the MS is allowed to use other networks but prefers to remain in the UMTS network). It is contemplated that subscriber preferences may be specified for networks other than GSM and/or UMTS or among two or more networks. It is further contemplated that the preferences may also be set based on subscriber's preferred connection properties (e.g. preferred data transmission rate) and other subscription data.

After receiving the ASSIGNMENT REQUEST message, the BSC 18 sends a signaling message (e.g., on SACCH) to the MS 16 concerning the channel it had allocated for the MS 16 and which also includes information relating to, for example, communication characteristics of the UMTS network(s) 28 adjacent to or neighboring the host or serving GSM network 12. Thereafter, a connection for MS 16 is established. Using the information provided by the serving network, the MS 16 performs signal measurements on the radio signals from appropriate BS(s) 30 of the UMTS network 28 and sends measurement reports concerning quality of the signals from the UMTS network 28 to the BSC 18 of the serving network (i.e. GSM network 12 in this example). The MS 16 also sends to the BSC 18 a signaling message such as, for example, a CLASSMARK UPDATE message that includes information useful to the neighboring UMTS network(s) (i.e., the UMTS Access Network Classmark (UMTS AN CM) information element defined in the UMTS standard). When the BSC 18 determines a handover is deemed necessary or appropriate (which may, for example, be based on the quality of radio signals between the MS 16 and the neighboring wireless network meeting one or more predetermined handover criteria such as a minimum threshold defined by, for example, an acceptable bit error rate, level of interference, or congestion), the BSC sends a HARD HANDOVER REQUIRED message containing the UMTS AN CM information element combined or incorporated in an OLD BSS TO NEW BSS information element to the MSC 20. The predetermined minimum threshold need not be an exact numerical value but may instead be an approximate one. The MSC 20 thereafter transmits a HANDOVER REQUEST message including the OLD BSS TO NEW BSS INFORMATION element to the IWU 40. The HANDOVER REQUEST (in GSM) performs similar functions in BSC as does the ASSIGNMENT REQUEST, i.e., reservation of a dedicated channel for MS 16 as specified by the core network. Therefore, the Network Preference parameter as described above may also be present (together with other parameters) in the HANDOVER REQUEST message (or other similar messages) to guide handovers between the UMTS AND GSM networks, even after an initial HANDOVER between the systems. The IWU 40 then passes a UMTS HANDOVER REQUEST message to an appropriate RNC 32 of the adjacent UMTS network and "transparently" transfers the OLD BSS TO NEW BSS INFORMATION element to a UTRAN TO UTRAN INFORMATION element containing the UMTS AN CM information element and, preferably, the Network Preference Parameter. Where the MSC 20 is configured as a third-generation MSC, the IWU 40 may be eliminated and the UMTS AN CM information element may be sent directly from this MSC to the appropriate RNC 32 of the adjacent UMTS network 28. After the UMTS network 28 has established a communication channel for the MS 16 using, for example, the information contained in UMTS AN CM, a handover procedure is executed.

It is contemplated that instead of or in addition to obtaining the new Network Preference parameter from the HLR 24, the MSC 20 may acquire, through the BSS, the new Network Preference parameter from the MS 16 wherein the new Network Preference parameter may be contained in a Subscriber Identity Module of the MS 16. In this case, the Network Preference parameter may be encoded in, for example, the CLASSMARK Type 3 information element, or the QoS (i.e. Quality of Service) information element in the SETUP message from the MS. The new Network Preference parameter is provided as a further input to the handover procedure to be executed by the system 10, which procedure may include factors such as, for example, data transmission rate, network congestion, the location of the MS, etc. Thus, for example, if the neighboring network is congested, access to it will be denied, if not, access will be granted.

Figure 3:
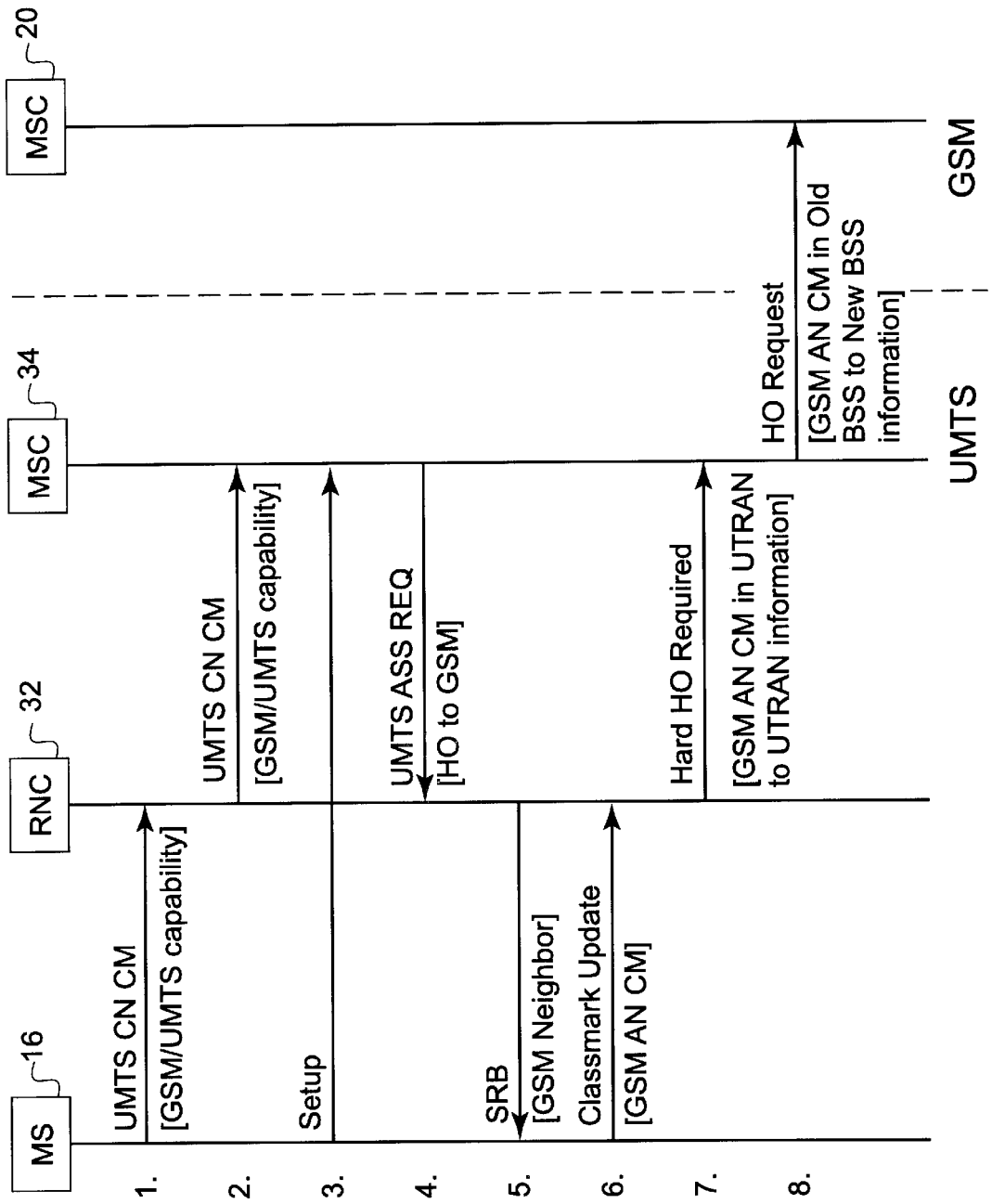
FIG. 3 is a signal flow diagram illustrating another embodiment of the invention for handing over a voice call from a UMTS network to a GSM network.

FIG. 3 is a signal flow diagram illustrating another embodiment of the present invention, wherein a communication transaction initiated in the UMTS network 28 is handed over to the GSM network 12. Similar to the embodiment of FIG. 2, MSC 34 retrieves subscription data during, for example, location or routing area update of MS 16. The MS 16 sends a UMTS CN CM information element to a RNC 32, which then sends the UMTS CN CM information element (e.g. in an initial message) to a core network node, e.g., MSC 34, indicating that the MS 16 is capable of using a multitude of networks including GSM and UMTS networks 12, 28. The MS 16 also sends to the MSC 34 through the RNC 32 a SETUP message containing the requisite information for establishing a communication transaction. The MSC 34 may then send the RNC 32 a signaling message such as UMTS ASSIGNMENT REQUEST or BEARER REQUEST that includes the Network Preference parameter (as described above) indicating whether the to-be-setup connection may be routed to another network such as GSM network 12. The new Network Preference parameter may be piggybacked to or incorporated in an appropriate octet layer of the UMTS ASSIGNMENT REQUEST information element or the BEARER REQUEST information element. The UMTS ASSIGNMENT REQUEST or the BEARER REQUEST generally provides the RNC 32 various types of information including, for example, channel rate and type, permitted speech version indication, data rate and transparency indicator, etc., so that the RNC 32 may determine the radio resource(s) required for the connection. The RNC 32 sends a message on a signaling channel (e.g., SIGNALING RADIO BEARER (SRB)) to the MS 16 concerning the channel allocated for the connection, and a call connection is thereafter setup. The message on the signaling channel also includes information relating to, for example, communication characteristics of the GSM network(s) 12 neighboring the host or serving UMTS network 28. Using the information provided by the serving network, the MS 16 performs signal measurements on the radio signals from appropriate BTS(s) 14 of the GSM network(s) 12 and sends measurement reports concerning quality of the radio signals from the UMTS network 28 to the RNC 32 and MSC 34 of the serving network (i.e. UMTS network 28 in this example). The MS 16 also sends to the RNC 32 a signaling message such as, for example, a CLASSMARK UPDATE message that includes information useful to the neighboring GSM network(s) (e.g., the GSM Access Network Classmark (GSM AN CM) information element defined in the GSM standard). When the RNC 32 determines a handover is necessary or appropriate (which may, for example, be based on the quality of radio signals between the MS 16 and the neighboring wireless network meeting a predetermined handover criterion or a minimum threshold as described in connection with the embodiment of FIG. 2), the RNC 32 sends a HARD HANDOVER REQUIRED message containing the GSM AN CM information element in a UTRAN TO UTRAN information element to the MSC 34. In this case, the "GSM AN CM" would be relayed "transparently" through the MSC in a manner similar to the transmission of UMTS AN CM as in the embodiment of FIG. 2.

The MSC 34 thereafter transmits a HANDOVER REQUEST message including the OLD BSS TO NEW BSS information element containing the GSM AN CM information element to a core network node of GSM network 12 such as, for example, MSC 20 (through an IWU, if required) to request an appropriate target BSC 18 to reserve the requisite radio resource(s).

It is noted that the above described method of transmitting the GSM AN CM (i.e. the CLASSMARK defined in GSM standard and utilized by BSC) to the target BSC is novel to GSM because the GSM CLASSMARK is contained in the "transparent" portion of the HANDOVER REQUEST (i.e., the OLD BSS TO NEW BSS information element for passing information transparently between BSSs via the MSC). In GSM, the CLASSMARK is transferred to the target BSC in the "non-transparent" portion of the HANDOVER REQUEST (i.e., the CLASSMARK utilized by BSC is stored during the connection in MSC/VLR and placed in the message by MSC/VLR). Thus, an alternative method of transferring the GSM AN CM (here, GSM CM2, GSM CM3 or a new GSM AN CM) is to follow GSM principles: provide the MSC with the GSM CM or the requisite information to compose it. Accordingly, the UMTS CN CM initially sent from MS 16 may contain information necessary for the MSC 20 to compose or create a GSM CM2 or CM3 that must be present in a GSM HANDOVER REQUEST message. Optionally, the MS 16 may send a CLASSMARK UPDATE to MSC 20 containing the GSM CM2 or CM3. In this case, consistent with GSM principles, the MSC 34 shall add the GSM CLASSMARK onto the HANDOVER REQUIRED message received from RNC 32 (in such event, the UTRAN TO UTRAN information element plays no role).

After the GSM network 12 has established a communication channel for the MS 16 using, for example, the information contained in a GSM CLASSMARK message, a handover procedure is executed.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of initiating a network-assisted handover of a communication transaction from a serving wireless network to a neighboring wireless network that employs communication protocols different from those of the serving wireless network, said serving wireless network including a serving core network portion and a serving radio access network portion, said method comprising the steps of:
   (a) sending a message from a mobile station to a controller of the core network portion of the serving wireless network which includes an indication that the mobile station is capable of communicating with the neighboring wireless network, wherein the neighboring wireless network including a neighboring core network portion and a neighboring radio access network portion, the neighboring core network portion and the neighboring radio access network portion being separate from the serving core network portion and the serving radio access network portion;
   (b) providing to the controller of the core network portion of the serving wireless network information concerning whether a user of the mobile station may utilize the neighboring wireless network;
   (c) using the information of steps (a) and (b), generating a parameter by the controller of the core network of the serving wireless network for assisting the controller of the radio access network portion of the serving wireless network in determining initiation of a handover; and
   (d) sending the parameter from the controller of the core network portion to the controller of the radio access network portion of the serving wireless network.

2. The method of claim 1, further comprising the step of retrieving information from a database relating to a user's preference of usage of one of the serving wireless network and the neighboring wireless network so that the handover determination of step (c) is further limited by the user's preference.

3. The method of claim 2, further comprising the step of retrieving additional information from the database relating to the user's permission to use the neighboring wireless network so that the handover determination of step (d) is further limited by the user's permission.

4. The method of claim 1, wherein in step (a) the message indicating the mobile station's capability to communicate with the neighboring wireless network is included in a CLASSMARK information element.

5. The method of claim 1, wherein in step (a) the message indicating the mobile station's capability to communicate with the neighboring wireless network is included in a BEARER CAPABILITY information element.

6. The method of claim 1, wherein in step (a) the message indicating the mobile station's capability to communicate with the neighboring wireless network is included in an ACCESS PDP REQUEST information element.

7. The method of claim 1, wherein in step (d) the parameter is included in an ASSIGNMENT REQUEST message for initial assignment of a radio channel.

8. The method of claim 7, wherein the parameter is included in a HANDOVER REQUEST message in a subsequent handover between the serving wireless network and the neighboring wireless network.

9. The method of claim 1, further comprising the steps:
   (e) monitoring a quality of radio signals between the mobile station and the neighboring wireless network; and
   (f) determining by the controller of the radio access network portion that a handover to the neighboring wireless network is necessary in response to the quality of radio signals between the mobile station and the neighboring wireless network meeting at least one handover criteria and the parameter generated in said step (c).

10. A wireless telecommunication system for performing initiation of a network-assisted handover of a communication transaction between a serving wireless network and a neighboring wireless network that employs communication protocols different from those of the serving wireless network, wherein the serving wireless network includes a serving core network portion and a serving radio access network portion, said system comprising:
    (a) a mobile station for sending a message which includes an indication that the mobile station is capable of communicating with the neighboring wireless network, wherein the neighboring wireless network includes a neighboring core network portion and a neighboring radio access network portion, said neighboring core network portion and said neighboring radio access network portion being separate from said serving core network portion and said serving radio access network portion;
    (b) a controller of the radio access network portion of the serving wireless network for communicating with the mobile station and for determining initiation of a handover; and
    (c) a controller of the core network portion of the serving wireless network, the controller being configured to receive information concerning whether a user of the mobile station may utilize the neighboring wireless network and the message from the mobile station indicating that the mobile station is capable of communicating with the neighboring wireless network, the controller being further configured to generate a parameter, based on the received information and the message from the mobile station, for assisting said controller of the radio access network portion of the serving wireless network in determining initiation of a handover.

11. The system of claim 10, further comprising means of retrieving information from a database relating to the user's preference of usage of one of the serving wireless network and the neighboring wireless network so as to further limit sending of the handover request based on the user's preference.

12. The system of claim 11, further comprising means of retrieving additional information from the database relating to the user's permission to use said another wireless network so as to further limit sending of the handover request based on the user's permission.

13. The system of claim 10, wherein the serving wireless network is one of GSM and UMTS compliant networks and the neighboring wireless network is another of said GSM and UMTS compliant networks.

14. The system of claim 10, wherein said mobile station comprises a cellular phone.

15. The system of claim 9, wherein the controller of the radio access network is configured for determining that a handover to the neighboring wireless network is necessary in response to the quality of radio signals between the mobile station and the neighboring wireless network meeting at least one handover criteria and the parameter generated by the controller of the core network portion.

* * * * *